Jan. 11, 1949.                    E. MILLER                      2,459,040
                                 TRIPOD HEAD
                             Filed Nov. 12, 1947

Inventor:
Eric Miller
by his Attorneys
Howson &
Howson

Patented Jan. 11, 1949

2,459,040

UNITED STATES PATENT OFFICE 2,459,040

TRIPOD HEAD

Eric Miller, Rose Bay, near Sydney,
New South Wales, Australia

Application November 12, 1947, Serial No. 785,397
In Australia December 5, 1946

5 Claims. (Cl. 248—183)

This invention has been devised to provide an improved base mounting for instruments and machines which may require to be panned or tilted in the operation of adjusting or aligning or focusing. These base mountings are generally known as "tripod heads" and are referred to by such name herein. The tripod head of this invention is particularly useful as a base mounting for cinematograph machines but it is not confined to such use.

Tripod heads for cinematograph machines must be so constructed that panning and tilting can be carried out while the machine is in operation and without "chatter" of any kind whatsoever. If as the result of a faulty tripod head there is a chatter in the movement of the machine this chatter is amplified through the film and makes the projection on the screen objectionable.

Hitherto tripod heads generally used for the stated purposes incorporated metallic friction devices to permit panning and tilting movements but by reason of the nature of the surfaces in contact it was not possible to avoid the recurrence of chatter. If the friction in this type of tripod head is reduced sufficiently to enable the machine thereon to be swung freely in its respective panning and tilting movements then the skill of the operator must be relied upon to prevent the chatter and to maintain the machine aligned or focused which is a difficult and skilled operation. This difficulty is well known and tripod heads known as "gyro" heads have been devised to overcome the difficulty.

The object of this invention is to provide a tripod head having the advantages of the so named "gyro" head but which can be constructed at a fraction of the cost thereof.

The tripod head of this invention consists of two members each rotatable in a cylinder one said cylinder having means whereby it is affixed to a tripod or foundation (referred to hereinafter as a foundation). The member in this cylinder is affixed to the wall of the other cylinder. The member in this latter cylinder constitutes a mounting for the machine or instrument (referred to hereinafter as the machine). The machine so mounted can be moved to effect the panning and/or tilting operations. Both cylinders are charged with a grease or liquid (referred to hereinafter as "liquid") which surrounds the members and permits a free and regular movement of the members without chatter.

Figure 1:
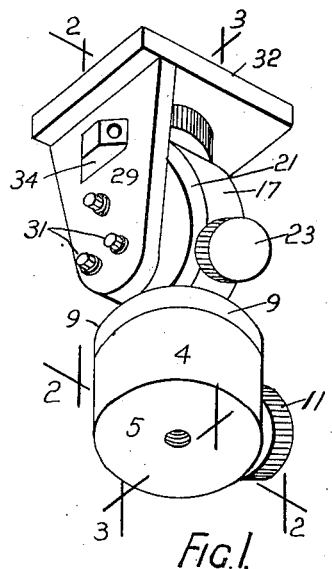
Figure 2:
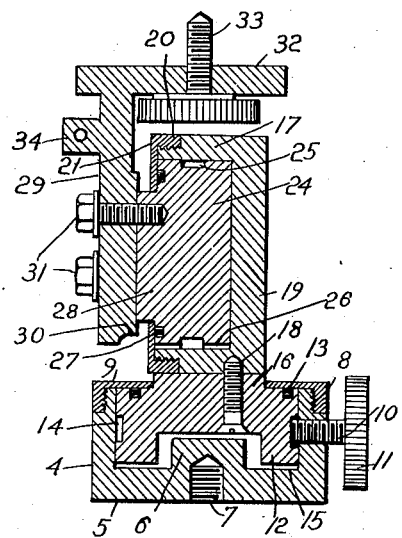
Figure 3:
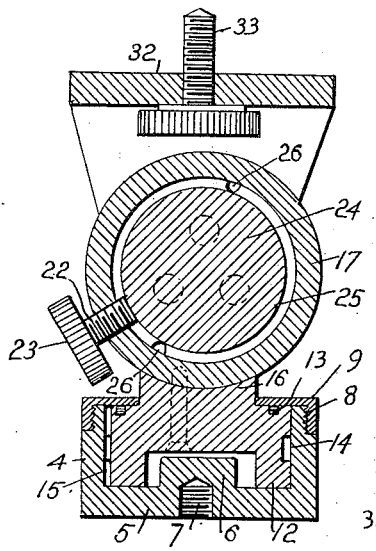
Figure 4:
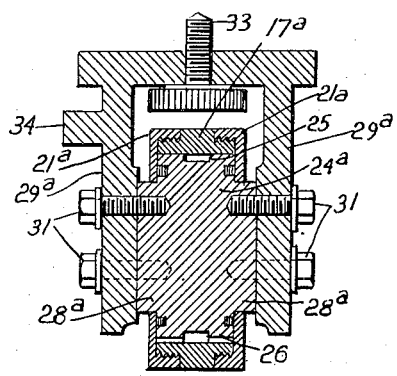
Figure 5:
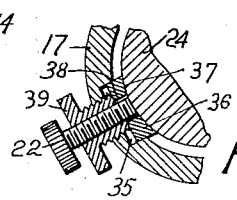

Other features of the invention will be referred to in the following description with reference to the annexed drawings which depict one preferred embodiment. In these drawings Fig. 1 is a perspective view of the tripod head; Figs. 2 and 3 are sectional elevations on planes 2—2 and 3—3 respectively of Fig. 1; Fig. 4 is a fragmentary sectional view similar to Fig. 2 showing a modification; Fig. 5 is a fragmentary sectional view showing a further modification.

Referring to the drawings one cylinder 4 has a closed end 5 with an internal boss 6 thereon. The boss 6 is bored and screwed as at 7 to take means whereby it is affixed to a foundation. The cylinder 4 is screwed at the other end as indicated at 8 to take a screwed annular cover 9. In the wall of the cylinder 4 there is a screwed hole through which a locking screw 10 projects. This screw has a knurled head 11.

In the cylinder 4 there is a cylindrical block 12 which is neatly fitting both as to diameter and length but is freely rotatable therein. The block 12 has an axial recess in the bottom to clear the internal boss 6 and an annular groove 13 in the top which is filled with a packing material such as felt which projects above the surface thereof and constitutes a seal against the cover 9. There is also a groove 14 in the periphery of the block 12 and it may have one or more ports or grooves 15 in the wall longitudinally and/or across the bottom radially. Boss 16 on the block 12 projects through the annular cover 9. The locking screw 10 is adapted to press against the block 12 in the groove 14 and lock it against rotation.

Cylinder 17 is mounted on the boss 16 with its axis at 90° to the axis of the cylinder 4. It is secured in position by screws 18 which pass through the block 12 and into the wall thereof. This cylinder 17 is closed at the end 19 and the open end is screwed as indicated at 20 to take a screwed annular cover 21. In the wall of this cylinder there is also a screwed hole through which a locking screw 22 projects. This screw has a knurled head 23.

In the cylinder 17 there is a cylindrical block 24 which is neatly fitting both as to diameter and length but is freely rotatable therein. This block 24 has a groove 25 in its periphery and it may have one or more ports or grooves 26 in the wall longitudinally and/or across the bottom radially. There is an annular groove 27 in the top of this block which is filled with a packing material such as felt which projects above the surface thereof and constitutes a seal against the cover 21. Boss 28 on this block 24 projects through the annular cover 21. The locking screw 22 is adapted to press against the block 24 in the groove 25 and lock it against rotation.

A right angle bracket has on one limb 29 a projection 30 complementary to the boss 28 to which it is affixed by set bolts 31. The other limb 32 of the bracket is the base for the machine which, in this embodiment, is affixed thereto by screw 33. This bracket also has a lug 34 to take an operating handle whereby the tripod head is operated.

Both cylinders 4 and 17 are charged with a liquid the viscosity of which is determined by the needs to which the particular tripod head is to be applied. This liquid fills the space between the cylindrical blocks 12 and 24 and the respective cylinders and it also fills the grooves 14 and 25 in the cylindrical blocks. For most purposes the construction of the cylindrical blocks and the cylinder covers 9 and 21 with the packings in the grooves 13 and 27 described above prevents the escape of the liquid but other sealing means may be incorporated. By selecting liquid of suitable viscosity for the work involved the resistance to movement of the cylindrical blocks in the respective cylinders can be regulated as desired.

Means may be incorporated to regulate the tolerance between the cylindrical blocks 12—14 and the ends of the respective cylinders in which they are housed for the purpose of increasing or decreasing the resistance to movement of the cylindrical blocks in the respective cylinders. In one embodiment this tolerance is regulated by annular plates fitted in each annular cover 9 and 21. These covers have screws or other devices therein adapted to bear against the annular plates. The annular plates bear against the packing material bedded in the respective cylindrical blocks.

It is within the scope of the invention to substitute for the cylinder 17, the cylindrical block 24 and the right angle bracket a cylinder 17a open at each end (see Fig. 4) having provision for affixing annular end covers 21a thereon. The cylindrical block 24a mounted in this cylinder has a boss such as 28a on each end thereof projecting through the respective end covers. The bracket is a U-shaped member; the limbs 29a of the U correspond to the limb 29 and are affixed to the respective bosses 28. The top of the U constitutes the base on which the machine is mounted. In all other respects this cylinder and its parts are identical to those described with reference to Figs. 1 to 3.

Fig. 5 shows a further modification of the invention wherein the cylinders 4 and 17 or either of them (a fragment of cylinder 17 is shown in in the drawing) have or has a brake block recess 35 formed in the wall thereof. A brake block 36 in the recess 35 has an arcuate face 37 adapted to bear against the respective cylindrical blocks 12 and/or 24. The brake block 36 is drilled as at 38 to permit the locking screw 10 and/or 22 to register with the cylindrical blocks 12 and/or 24. The locking screw or screws are screwed into and through a brake block screw 39. By this arrangement the brake block and the locking screw can be applied to the cylindrical blocks 12 and/or 24 independently. While the locking screw is intended to lock the cylindrical blocks 12 and/or 24 against rotation the brake block 36 is designed only to regulate the resistance to movement of the cylindrical blocks 12 and/or 24. It is useful in those extreme temperatures where the viscosity of the liquid normally employed is affected by the temperature.

I claim:
1. A tripod head consisting of two members each rotatable in a cylinder, one said cylinder having means whereby it is affixed to a foundation and the member therein being affixed to the wall of the other cylinder, the other said member constituting a mounting for a machine; both said cylinders being charged with a liquid which surrounds the members.

2. A tripod head consisting of a cylinder having means whereby it is affixed to a foundation, having a cylindrical block rotatable therein, said cylindrical block having a boss projecting from the cylinder constituting a mounting for a second cylinder which is affixed thereto said second cylinder having a cylindrical block rotatable therein, said cylindrical block having a boss projecting from the cylinder constituting a mounting for a machine, both said cylinders being charged with a liquid.

3. A tripod head consisting of a cylinder having a closed end with an internal boss therein which is bored and screwed to take means whereby it is affixed to a foundation, said cylinder being screwed externally at the other end and having an annular cover screwed thereon; a cylindrical block rotatable in said cylinder said cylindrical block having a groove in its periphery and having a boss projecting through the annular cover; a cylinder affixed to said boss with its axis at 90° to the axis of the first cylinder said cylinder having one end closed and the other end screwed externally with an annular cover screwed thereon; a cylindrical block rotatable in said cylinder said cylindrical block having a groove in its periphery and having a boss projecting through the annular cover; a right angle bracket affixed by one limb to said boss and having means on the other limb for securing a machine thereto; a locking screw in each cylinder adapted to bear against the respective cylindrical blocks.

4. A tripod head consisting of a cylinder having a closed end with an internal boss therein which is bored and screwed to take means whereby it is affixed to a foundation, said cylinder being screwed externally at the other end and having an annular cover screwed thereon; a cylindrical block rotatable in said cylinder said cylindrical block having a groove in its periphery and having a boss projecting through the annular cover; a cylinder affixed to said boss with its axis at 90° to the axis of the first cylinder said cylinder having one end closed and the other end screwed externally with an annular cover screwed thereon; a cylindrical block rotatable in said cylinder said cylindrical block having a groove in its periphery and having a boss projecting through the annular cover; a right angle bracket affixed by one limb to said boss and having means on the other limb for securing a machine thereto; a brake block in each cylinder and a screw to thrust each said brake block against the respective cylinder blocks.

5. A tripod head consisting of a cylinder having a closed end and means for attaching said cylinder to a foundation and having an annular cover affixed to the other end, a cylindrical block in said cylinder having a boss projecting through said annular cover; a second cylinder affixed by its cylindrical wall to said boss; said second cylinder being open at each end and having annular covers affixed to said ends, a cylindrical block in said second cylinder having a boss on each end projecting through said annular covers; a U bracket affixed by the limbs of the U to the respective bosses said U bracket having means for securing a machine thereto; a brake block in each said cylinder and a screw to thrust each said brake block against the respective cylinder blocks.

ERIC MILLER.

REFERENCES CITED

The following references are of record in the file of this patent:

UNITED STATES PATENTS

| Number | Name | Date |
| --- | --- | --- |
| 2,318,633 | Ries | May 11, 1943 |
| 2,323,473 | Korling | July 6, 1943 |
| 2,424,499 | Pasturczak | July 22, 1947 |